E. L. THORP.
ELECTROLYZING APPARATUS.
APPLICATION FILED NOV. 21, 1905.
930,902.
Patented Aug. 10, 1909.
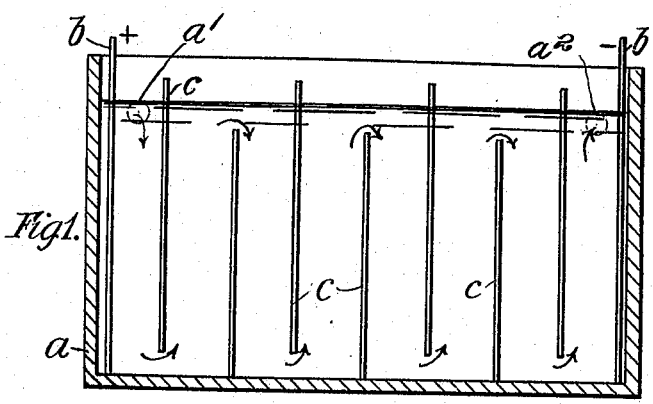
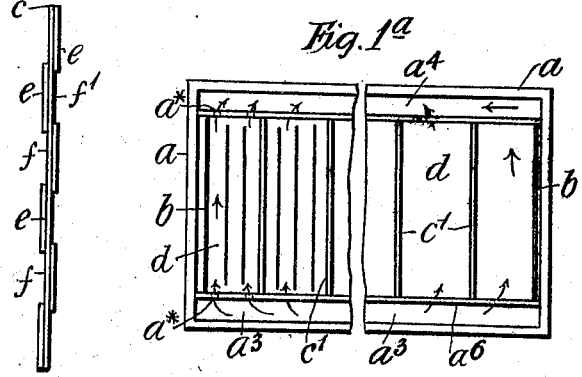 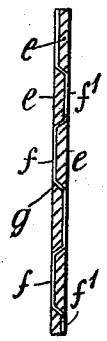
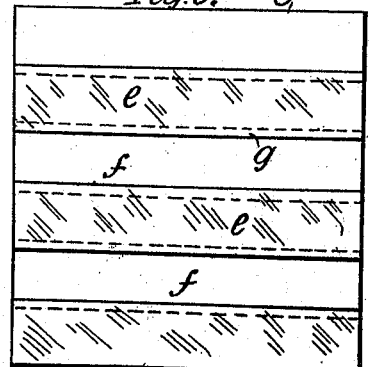 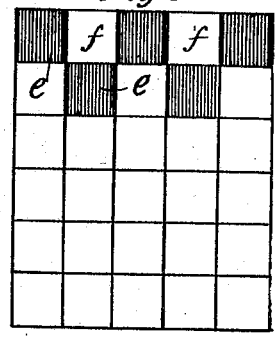
Witnesses:
Inventor
Edgar L. Thorp

UNITED STATES PATENT OFFICE.

EDGAR LESLIE THORP, OF NOTTINGHAM, ENGLAND, ASSIGNOR TO THE BRITISH HOSIERY & ELECTROLYTIC BLEACHING CO., LD., OF LONDON, ENGLAND.

ELECTROLYZING APPARATUS.

No. 930,902.　　　Specification of Letters Patent.　　　Patented Aug. 10, 1909.

Application filed November 21, 1905. Serial No. 288,475.

*To all whom it may concern:*

Be it known that I, EDGAR LESLIE THORP, a subject of the King of Great Britain, residing at 44 Parliament street, Nottingham, England, electrical engineer, have invented certain new and useful Improvements in and Relating to Electrolyzing Apparatus, of which the following is a specification.

This invention relates to improvements in electrodes for electrolyzing apparatus, such for instance as used for electrolyzing brine solutions to produce bleaching liquors, and has reference more particularly to the electrodes whereby the decomposition of the solution is effected.

The invention is designed to enable thin sheets or plates, say of platinum or platino-iridium, to be used very economically as the electrodes, while guarding against disintegration thereof. It is supposed that this disintegration is due to the molecular reaction set up within the metal by the different occluded gases (usually with a brine solution, hydrogen and chlorin) liberated at opposite sides or faces of the same sheet or electrode plate, and which, becoming absorbed or occluded in the metal, react with each other inside the metal itself. Now according to the present invention, means are provided for preventing any particular part of the electrode from having different gases liberated on opposite sides thereof, and this is effected without rendering any considerable portion of the metal inert and without altering its form materially from that of a flat plate or sheet. To this end the opposite surfaces of the plate may be divided up into sections, say by means of a suitable protective and insulating material, such as glass or slate, or in some cases celluloid, in such a manner that the portions of metal whose faces are exposed on one side to form active sections are distinct from those portions which form the active sections on the other side, while the insulating coverings or strips serve also as supports to stiffen or strengthen the sheet or plate, and alternate with each other on opposite sides. The metal sheet or electrode proper can thus be made very thin, as its mechanical strength is scarcely called into play, and the arrangement is a very economical one since practically the whole of the platinum sheet is in operation with the possible exception of the narrow non-active intervening bands or sections hereinafter mentioned. It will thus be seen that if the active sections on one side of the plate should become charged or permeated with occluded hydrogen, there is no chance of such occluded hydrogen setting up reactions or molecular effects inside the plate with the chlorin produced or liberated on the opposite side, and hence disintegration of the plate from this cause is entirely prevented, while a very simple and durable construction of electrode is attained.

In order that the invention may be more readily understood, reference will now be had to the annexed drawings in which:—

Figure 1 is a section of an electrolytic cell of a type with which the improved electrodes may be advantageously employed. Fig. 1$^a$ is a plan showing a modified arrangement thereof. Fig. 2 is a vertical section showing one construction of electrode having a flat sheet with the active sections all in the same plane, the thickness being exaggerated to make the figure clear. Fig. 3 is a front elevation of the electrode shown in Fig. 2. Fig. 4 is a cross section illustrating a modification of the electrode shown in Fig. 2 and indicating how the active sections may have slight shoulders or off-sets between them. Fig. 5 is an elevation showing another form or modification.

$a$ is the electrolyzer trough or cell proper; $b$ are the two main positive and negative plates or poles and $c$ are the intermediate electrodes dividing the electrolyzer into compartments $d$, which in effect are distinct cells. These cells may be arranged so that the solution can flow from one to the other as shown by the arrows in Fig. 1, or so that it can flow sidewise through each cell independently as shown by the arrows in Fig. 1$^a$. On applying to the terminal electrodes $b$ a difference of potential of say 200 volts, there will be set up in each compartment or cell $d$ a difference of say 5 to 7 volts more or less, according to the number of cells, and the liquid will be subjected to decomposition as it flows through each disengaging say chlorin on one side and say hydrogen on the other side of each electrode. In Fig. 1 the liquid enters at $a'$ and flows away at $a^2$ after passing alternately up and down over and under the electrodes. In Fig. 1$^a$ however, the liquid is fed into a side compartment $a^3$ and flows across to an outlet compartment $a^4$ through suitable apertures $a^5$ in the longitudinal walls $a^6$. The electrodes $c$ are fixed between these walls $a^6$ and every third or fourth one $c'$ is arranged to form a division plate so as to separate the apparatus into sections, and to act as a partition or wall $c'$ to divide off the spaces or cells $d$.

Referring to Figs. 2 and 3, it will be clear how the platinum or platino-iridium conducting plate or sheet $c$ which forms the body of the electrode, is flat and is provided with transverse strips of glass, varnish, or other suitable insulator $e$ cemented thereto at suitable distances apart so that the intervening exposed active sections or parts $f$ on one side alternate with the sections $f'$ on the other side. The edges of the strips $e$ on opposite sides overlap somewhat, leaving between them a narrow neutral or non-active band or section of metal $g$ covered on both sides with insulating material, thus better insuring the separation of the different active sections $f$ $f'$. Thus the electrode as shown consists of an active section $f$ exposed on one side; then above this a very narrow non-active band or intervening section $g$ covered on both sides by the overlapping edges of the insulator $e$, then another active section $f'$ exposed on the opposite side, and so on. Owing to the plate or sheet being used in a flat form it is utilized very economically and the portions thereof $(g)$ which are inactive are reduced to an absolute minimum. In this way the metal forming the section $f$ which is exposed say to chlorin on one side of the plate is kept distinct from that of the section $f'$ which is exposed to say hydrogen on the opposite side, although it is very closely connected therewith, both electrically and integrally, and thus molecular actions of the kind referred to are obviated. Care must be taken that the currents are not stronger than the neutral intervening bands or strips $g$ can transmit without heating. Obviously these neutral bands $g$ may be bent sidewise somewhat, as in Fig. 4, and strips $e$ may then lie flush in the bends, hollows or sections, whereas in Fig. 2, the adjacent strips $e$ project more or less from the plate on opposite sides. In the latter case, they have the advantage of serving to protect the plate from accidental damage by contact with any cleaning instruments inserted into the cell. In either case, however, the exposed sections lie substantially in or very near the same plane and the plate or sheet is provided with extended flat faces thus as stated reducing the extent of the neutral portions $g$ and so using the platinum in the most economical manner.

Instead of being merely divided into longitudinal sections, the faces of the plate may be divided up in different ways, say checkerwise into squares as in Fig. 5, which alternate with each other on opposite sides in the manner above referred to. Moreover instead of using insulating strips, an insulating grid may be employed, or the plates may simply be coated with a suitable varnish at the parts required. According to a further modification the platinum sheet may be corrugated to increase the active surface and the strips may be similarly corrugated to correspond thereto if desired. The protective insulating material by which the faces of the plate are thus divided may be arranged also to serve as a strengthening frame or support, and suitable distance pieces or separators may be arranged between the plates, preferably resting at their points of contact only against such insulating material thereby preventing the covering up of any parts of the active sections. Convenient arrangements may also be provided to enable any individual plate to be removed if desired.

What I claim and desire to secure by Letters Patent of the United States is:—

1. An electrode formed of a plate or sheet having active sections on one side thereof alternating with active sections on the other side, a covering of insulating material applied over each of the unexposed sides of the sections, the edges of said coverings on opposite sides of the sheet overlapping slightly and forming narrow neutral strips covered on both sides, substantially as and for the purpose set forth.

2. An electrode having alternating exposed or active strips or sections on opposite sides, such sections lying substantially in the same vertical plane in order to reduce the extent of the neutral intervening portions, and having inactive or covered vertical strips between said active strips, and a thin insulating covering for the inactive strips, such covering being wider than the active strips, so as to form narrow neutral strips covered on both sides, substantially as described.

In testimony whereof I have hereunto set my hand in presence of two subscribing witnesses this 4th day of November 1905.

EDGAR LESLIE THORP.

Witnesses:
  ERNALD SIMPSON MOSELEY,
  MALCOLM SMETHURST.